(12) United States Patent
Bietenhader

(10) Patent No.: US 7,472,864 B2
(45) Date of Patent: Jan. 6, 2009

(54) DEVICE FOR FILTERING VIBRATION BETWEEN TWO PARTS, AND APPLICATIONS THEREOF

(75) Inventor: Claude Bietenhader, Lambesc (FR)

(73) Assignee: Eurocopter, Marignane (FR)

( * ) Notice: Subject to any disclaimer, the term of this patent is extended or adjusted under 35 U.S.C. 154(b) by 461 days.

(21) Appl. No.: 11/280,300

(22) Filed: Nov. 17, 2005

(65) Prior Publication Data

US 2008/0093499 A1 Apr. 24, 2008

(30) Foreign Application Priority Data

Nov. 30, 2004 (FR) .................................. 04 12715

(51) Int. Cl.
*B64C 27/06* (2006.01)
(52) U.S. Cl. ..................... 244/17.27; 267/136
(58) Field of Classification Search .............. 244/17.27; 188/379, 380; 248/557, 559
See application file for complete search history.

(56) References Cited

U.S. PATENT DOCUMENTS 4,085,825 A 4/1978 Scarborough et al.

| | | |
|---|---|---|
| 4,420,134 A | 12/1983 | Flannelly et al. |
| 6,247,684 B1 | 6/2001 | Manfredotti |

FOREIGN PATENT DOCUMENTS

| | | |
|---|---|---|
| FR | 2 499 505 | 8/1982 |
| FR | 2 747 098 | 10/1997 |
| FR | 2 787 161 | 6/2000 |

*Primary Examiner*—Tien Dinh
(74) *Attorney, Agent, or Firm*—Young & Thompson

(57) ABSTRACT

A device for filtering vibration between two parts (2 and 3), includes:

at least a first resilient plate (4) connected to the parts (2 and 3) at two respective fastener points at two respective points (2A and 3A), the first plate (4) being locally deformable under the action of vibration transmitted by one of the parts to the other part; and at least a first resonator (7) fitted with two laminated elastomer bearings (8, 9) receiving respective fastener elements (80, 90) fastening it to the first resilient member (4) in such a manner as to set the resonator (7) into oscillating pivoting motion in the event of the local deformation of the first resilient plate (4) such that the resonator (7) generates an anti-vibratory inertia torsor that opposes the vibration and filters transmission thereof from one part to the other.

27 Claims, 8 Drawing Sheets

DEVICE FOR FILTERING VIBRATION BETWEEN TWO PARTS, AND APPLICATIONS THEREOF

The present invention relates to a device for filtering vibration between two parts, and also to applications of said filter device.

BACKGROUND OF THE INVENTION

More particularly, such a device serves to provide an elastic connection between two parts for transmitting static forces from one to the other along the axis of the device, while simultaneously filtering the transmission of associated dynamic forces along the axis from one of the parts to the other.

Although said device can be used in any situation where it is important to filter vibration transmitted between two parts, it is particularly applicable to improving an aircraft suspension device for a gearbox for transmitting engine torque to a driven member, and in particular a main transmission gearbox of a helicopter.

Problems of vibration arise in a helicopter in very specific manner. The main rotor for providing the helicopter with lift and propulsion naturally constitutes a powerful generator of vibration that is transmitted to the fuselage, with the level of the vibration conditioning firstly comfort in the cabin and vibration of the controls, and secondly conditioning the levels of dynamic mechanical stresses throughout the machine. As a result, the dynamic stresses impact on the fatigue lifetime of the parts and the various items of equipment, and consequently the lifetime of the various elements constituting the helicopter.

A large amount of research has been undertaken at least to attenuate, if not completely eliminate, this level of vibration that is inherent to the very operation of the rotor which transmits to the hub not only static or quasi-static forces and moments created by:

lift (perpendicular to the plane of the rotor);

drag (in the plane of the rotor and parallel to the component $V_{H'}$ of the forward speed of the helicopter that is normal to the rotor mast); and drift force (perpendicular to the two preceding forces and also in the plane of the rotor) which remains small and can generally be ignored;

but also periodic forces and moments coming from aerodynamic asymmetries (profile drag and lift) that appear during rotation of the blades, essentially due to the forward speed in translation flight at high speed, or also to asymmetries that result from unequal distribution of speeds induced on the disk of the rotor at low speed (transition zone). These alternating aerodynamic forces and moments are transmitted to the center of the rotor after being attenuated or amplified naturally by the blades.

Writing the speed of rotation of the rotor in general manner as $\Omega$, expressed in revolutions per second, and writing the number of blades as $b$, it is recalled that:

the forces (due to the flapping movements of the blades) and the moments (due to the drag movements of the blades) whose axes are carried by the rotor axis, are transmitted to the mast and to the fuselage only if their frequency, expressed in hertz (Hz) is a harmonic of $b\Omega$, and thus of the form $kb\Omega$ (where $k$ is a positive integer equal to or greater than 1), with these forces and moments of the rotating axes being transferred to the stationary axes without any change of frequency (pumping and twisting effects in the structure); and the forces (due to the drag movements of the blades) and the moments (due to the flapping movements of the blades) of axes lying in the plane of the rotor, are transmitted to the mast and to the fuselage only if their frequency is of the form $(kb\pm1)\Omega$, with the resulting forces and moments then being at a frequency $kb\Omega$ about stationary axes (rolling and pitching effects, transverse or longitudinal shaking, mainly in $b\Omega$).

Whatever the origin of the excitation, it can thus be seen that a well-balanced rotor transmits to the fuselage, in addition to static forces and moments, only those dynamic forces and moments that are harmonics of $b\Omega$ ($k=1, 2, 3, \ldots$), and that in most cases it is excitation at the first harmonic $b\Omega$ that predominates.

In practice, the vibration that is the most troublesome and the most penalizing in a fuselage is vibration in planes that are substantially vertical. Consequently, devices for filtering the transmission of vibration between the rotor and the fuselage of a helicopter are designed in such a manner as to minimize, or even cancel, the following torsor;

a substantially vertical dynamic force, also referred to as "pumping"; and dynamic moments in pitching (or "longitudinally") and in rolling (or "laterally").

French patent No. 2 499 505 in the name of the Applicant discloses a suspension device for the main transmission gearbox of a helicopter that is effective in filtering such vibration generated by the main rotor providing lift and propulsion.

To this end, the device described in that document is of the type comprising a suspension plate that is situated substantially in a plane perpendicular to the axis of the rotor and having a central portion secured to the bottom of the transmission gearbox, and a set of at least three support bars having top ends connected to the top of the transmission gearbox and bottom ends hinged to the outside ends of arms extending radially around the base of the transmission gearbox, to which they are connected and also, in the region of their outer ends, to the fuselage at strong points thereof. The various connections of each radial arm enable it to move by deformation in the radial plane that contains it, with this movement imparting large displacements to a resonator means constituted by a vibrating mass mounted at the end of a blade serving as a support and whose other end is secured to the corresponding radial arm. Otherwise the suspension plate is independent of the radial arms and is constituted by a thin sheet-metal diaphragm that is deformable in bending under forces exerted perpendicularly to its plane and/or pivot moments exerted around its center by the transmission gearbox, but rigid in traction/compression and in shear under forces and moments exerted in its own plane, such as the torque in reaction to driving the rotor, said diaphragm being integrated in the top structure of the fuselage.

Although particularly effective, said prior art suspension device presents certain drawbacks, and in particular:

it is of limited accessibility and it is bulky, in particular because of the presence of the above-mentioned resonator means; and its cost is high, in particular because of the specific arrangement for enabling the suspension blades and the mass supports to operate effectively.

French patent document No. 2 787 161 discloses an antivibration device suitable for being mounted between the main transmission gearbox and the fuselage of a helicopter to filter the transmission of vibration between them.

In particular, that anti-vibration device enables the vibrating masses of the kind mentioned above to be eliminated, and it can be installed as a replacement for each of the above-mentioned support bars.

To this end, that prior art vibration filter device comprises:
a resilient annular element connected firstly to the top portion of the transmission gearbox and secondly to the fuselage in such a manner as to act as a connection therebetween, and suitable for being deformed under the action of vibration generated by the main rotor; and
resonator means connected via at least two blades which are flexible in bending and rigid in traction and in compression, to the inside face of said annular element in such a manner as to be set into oscillating pivoting motion during deformation of said annular element produced by the action of said vibration, such that by said oscillating pivoting motion, said resonator means generates an anti-vibratory inertia force opposing said vibration, thereby reducing the transmission thereof from the rotor to the fuselage.

Nevertheless, that prior art anti-vibration device also presents certain drawbacks:
its mass is significant, since the resonator means comprises vibrating masses connected to the annular element via rigid supports working in bending and blades that are flexible in bending and rigid in traction and in compression. The bending stresses of the supports lead to large dimensions and consequently to high mass for said supports, which are generally made of steel;
the flexible blades are relatively fragile because of the way in which they operate, in particular because of the high stresses due to the dynamic forces and moments, and also because of the static stresses, which can lead to said blades having short lifetimes; and
its amplification ratio λ, characterizing the effectiveness of the device, is contained within small limits.

OBJECTS AND SUMMARY OF THE INVENTION

An object of the present invention is to remedy those drawbacks. The invention provides a vibration filter device of small cost and size, that is particularly simple and reliable, making it possible effectively to reduce the transmission of vibration between two parts, and in particular between two segments of a bar, for example a bar interconnecting two vibrating elements, said anti-vibration device being suitable for use in particular to improve a device for suspending a rotary wing aircraft transmission gearbox and to filter in particular surging vibration.

To this end, according to the invention, said device is remarkable in that it comprises:
at least a first resilient plate connected to said parts at two respective fastening points defining an axis YY, said first plate being locally deformable under the action of vibration transmitted by one of said two parts to the other part; and
at least a first resonator fitted with two laminated elastomer bearings which firstly define an axis XX that is substantially perpendicular to the axis YY, and secondly receive respective fastener means for fastening to said first resilient plate in such a manner as to put said resonator into oscillating pivoting motion during said local deformation of said first resilient plate such that said resonator generates an anti-vibratory inertia torsor that opposes said vibration and filters transmission thereof from one part to the other.

In an advantageous embodiment for providing sufficient stiffness for transmitting static forces and for providing local flexibility to enable vibration between the two parts to be filtered, the device of the invention comprises:
first and second substantially identical resilient plates disposed parallel to each other and facing each other, that provide the connection between said two parts, and that are locally deformable in substantially identical manner under the action of vibration transmitted by one of said two parts to the other part; and
a first resonator fitted with two laminated elastomer bearings respectively receiving fastener means for fastening to said first and second resilient plates in such a manner as to set said resonator into oscillating pivoting motion in the event of said plate deforming so as to generate anti-vibratory inertia torsor which, in opposition to said vibration, filters transmission thereof from one part to the other.

Thus, during transmission of the vibration, the two resilient plates deform locally in substantially identical manner and rotate (pivot) the resonator in particular due to the angular and radial deformations of the laminated elastomer bearings. By this pivoting, the resonator generates an anti-vibratory inertia torsor exerted on said two plates via the two laminated elastomer bearings so as to filter or even cancel transmission of vibration from one part to the other.

Preferably, each of the two laminated elastomer bearings comprises two distinct elements constituting two conically-shaped half-bearings for providing the best operating conditions, each conical element converging towards the other and being centered on the axis of the corresponding connection between the two plates of the resonator. It should be observed that the same could apply to any laminated elastomer bearing for connecting an arbitrary number of plates to an arbitrary number of resonators.

Advantageously, each plate constitutes a single element comprising at least the following portions:
two mutually-opposite rigid outer arms, each outer arm being shaped at its outer end in the form of a first eye joint;
said two outer arms are connected together by two resilient first extensions formed in the plane of said plate, each first extension serving to connect the outer vertex of each outer arm to the inner vertex of the other arm;
each outer arm has an inner second extension in the plane of said plate, lying between the two resilient first extensions, each inner second extension having the appearance of a triangle with a rounded vertex such that the rounded vertices of each second extension of each outer arm of said plate face each other without making contact, thereby defining a gap in the central zone of the device; and
each inner second extension is shaped at said rounded vertex to form a second eye joint.

Consequently, since a space is left between each of the two plates (which are substantially identical and facing each other), in order to enable a resonator to be put into place therein, said first eye joints (of which there are four; one at each outer end of each arm of each plate) and said second eye joints (of which there are four: one at each of the two rounded vertices of each plate) are such that;
the facing bores of each of the two facing first eye joints of each arm constitute two devises or bearings, each clevis supporting a connection pin connecting with said corresponding part; and the facing bores of each of the two second facing eye joints of each plate constitute two devises or bearings, each bearing supporting a connection pin connecting with the resonator.

Advantageously, each of the resilient extensions of each plate is made locally more flexible by means of slots that are mutually parallel and extend in a direction that is substantially perpendicular to the axis YY passing through each of the fastenings of said two parts to said device.

Thus, each resilient extension is in the form of a plurality of parallel blades connecting the outer vertex of each outer arm to the inner vertex of the other outer arm.

Preferably, the parallel resilient blades define slots of identical length. In this way, said blades are identical in stiffness and the set of blades then behaves as a corresponding number of identical parallel springs, thereby making stresses more uniform and facilitating dimensioning.

Consequently, it should be observed that each plate can be deformed substantially along the axis passing through each of the fastenings of said two parts to said device under the action of the vibration transmitted by one of the parts to the other. These dynamic deformations of small amplitude (a few millimeters for an application to a helicopter) actuate the resonator in oscillating pivoting motion, thereby "breaking" the vibration transmitted from one part to the other in the manner of a spring opposing an excitation.

Furthermore, the plurality of blades constituting each resilient extension makes the device fail-safe, i.e. in the unlikely event of a blade breaking, the only consequence will be a reduction in the extent to which vibration is filtered, and thus a corresponding reduction in the effectiveness of the anti-vibration device, the device nevertheless continuing to ensure that said two parts remain connected together. It will readily be understood that this redundancy of the blades is of great advantage in terms of safety.

Similarly, by construction, it happens firstly that each plate presents a large second moment of area about its main bending axis, and secondly that the connection pins between the two plates of the resonator are very close to each other, e.g. being 40 millimeters (mm) apart from each other in an application to a helicopter of medium weight, as explained below. The equivalent distance for a conventional device would be 60 mm to 65 mm, e.g. as described in French patent document No. 2 499 505.

Thus, the mechanical stresses that result from the static and dynamic forces transmitted by one of said parts to the other part are reduced because of the above-mentioned large second moment of area opposing bending, and they are minimized close to the main bending axis of said device. Consequently, the dimensioning of the connections between the plates and the resonator can be small, thus enabling the two connections between each plate and said resonator to be moved closer together by a first amount.

The resonator includes at least one element constituted by the following portions:
   a main core that is reinforced in its central zone, which central zone has two bores each receiving one of the connection pins connecting with said two plates; and
   an outer rim for increasing the inertia torsor.

Advantageously, the main core of the resonator contained in its pivot plane presents a shape that is of reduced thickness in the direction of the axis YY passing through each of the fastenings of said two parts to said device, and of a shape that is elongate in the perpendicular direction, The rim, which is substantially in the form of a circular arc, finishes off said core at each outer end of the elongate shape.

Compared with the resonators of French patents Nos. 2 499 505 and 2 787 161, whose blades are subjected essentially to dynamic bending stresses, the core and the rim of the resonator of the invention are subjected to dynamic stresses in shear only during the oscillating movements of the resonator. It happens that the resonant frequencies of the resonator when working in shear mode are much higher than when working in bending mode, which makes it easy to keep them far away from the frequency to which the resonator is set, which frequency is substantially equal to one of the first harmonics $kb\Omega$.

The choice of material is then less critical when it comes to suitably positioning the frequencies.

In addition, since such a resonator is subjected essentially only to dynamic shear stresses and not directly to static or dynamic forces exerted by said two parts, as is the case for the resonator as disclosed in French patent No. 2 787 161, this means that it can be made out of an aluminum alloy, thereby achieving a very considerable saving in weight for such a device.

In order to further increase the effectiveness of the device, it is possible to dispose an additional mass at the outside of each rim, said additional mass being of high density, i.e. being of a material such as inermet, for example. These rims and additional masses associated therewith essentially constitute the elements commonly referred to as "vibrating masses".

In addition, the two connections between the resonator and the plates can be moved closer together by a second amount that is obtained advantageously by directly integrating the above-mentioned laminated elastomer bearings in bores provided for this purpose and made, as mentioned above, in the reinforced zone of the core of the resonator.

Since the bearings are subjected essentially to dynamic shear stress and not directly to the static and dynamic forces exerted by said two parts, as are the bearings of the resonator as disclosed in French patent No. 2 499 505, the dimensioning of the resonator bearings in the invention can be considerably smaller, thereby further facilitating this second reduction in the spacing between the bearings.

These first and second reductions in the spacing between the bearings enable an amplification ratio $\lambda$ to be obtained that is unprecedented compared with existing devices, and consequently enable exceptional effectiveness to be achieved, e.g. compared with French patent No. 2 787 161. It is recalled that this amplification ratio represents the ratio of the distances between the centers of gravity of the two groups of vibrating masses (one group of vibrating masses at each end of the elongate shape of the resonator core) over the distance between the axes of the laminated elastomer bearings. In a helicopter application, the improvement in amplification, and correspondingly in effectiveness, can be 50% or even more, thus leading to an exceptional reduction in weight of the device, which is particularly important for a device that is to be used on board an aircraft such as a helicopter.

In addition, it will be understood that, in a variant, the device of the invention may have two resonators that are substantially identical, disposed on either side of a single plate and connected thereby by two pins, each pin being mounted within a laminated elastomer bearing.

Advantageously, the vibration filter device of the invention can also be made to be symmetrical about a point.

Naturally, in the context of the present invention, said vibration filter device can be mounted between any two parts, at least one of which vibrates, the device serving to reduce the transmission of the vibration to the other part.

Nevertheless, in a preferred embodiment, said two parts correspond to two segments of a bar, such that the device of the invention is integrated within said bar, e.g. a bar of the above-specified type for supporting the main transmission gearbox of a helicopter.

The present invention also provides a device for suspending a transmission gearbox of a rotary wing aircraft, said transmission gearbox being mounted between propulsion means and a rotor for providing said aircraft with lift in substantially longitudinal manner along the axis of said rotor, and being suspended relative to the fuselage of said aircraft, said suspension device comprising support bars distributed radially around said transmission gearbox whose top ends are connected to the top portion of the transmission gearbox and whose bottom ends are connected to said fuselage.

According to the invention, said suspension device is remarkable:

in a first embodiment, in that at least some of said support bars are made up of pairs of segments, and in that said suspension device includes, for each of the support bars formed in this way, an anti-vibration device in accordance with the invention, that is arranged between said segments of said support bar; and in a second embodiment, in that for at least some of said support bars, it further includes, on each occasion an anti-vibration device in accordance with the invention that is arranged at one end of the corresponding bar and that is designed to reduce the transmission of vibration between said bar and the element (fuselage or transmission gearbox, for example) to which said end of the bar is connected.

This suspension device in accordance with the invention thus serves to remedy the drawbacks of the prior art suspension devices as described in particular in above-specified French patents Nos. 2 499 505 and 2 787 161, since:

because the anti-vibration device is integrated in the parts or in the support bars, thus omitting mass supports and vibrating masses between the transmission gearbox and the bearing parts, the overall size of said suspension device is small and its accessibility is increased;

its weight is small, in particular because the resonator can be made at least in part out of aluminum alloy; and its amplification ratio λ, characterizing the effectiveness of the device, can be increased compared with that of prior art devices.

BRIEF DESCRIPTION OF THE DRAWINGS

The invention can be better understood with the help of the following non-limiting description given with reference to the accompanying drawings, in which.

The elements that appear in more than one figure are given the same reference in all of them.

MORE DETAILED DESCRIPTION

Figure 1:
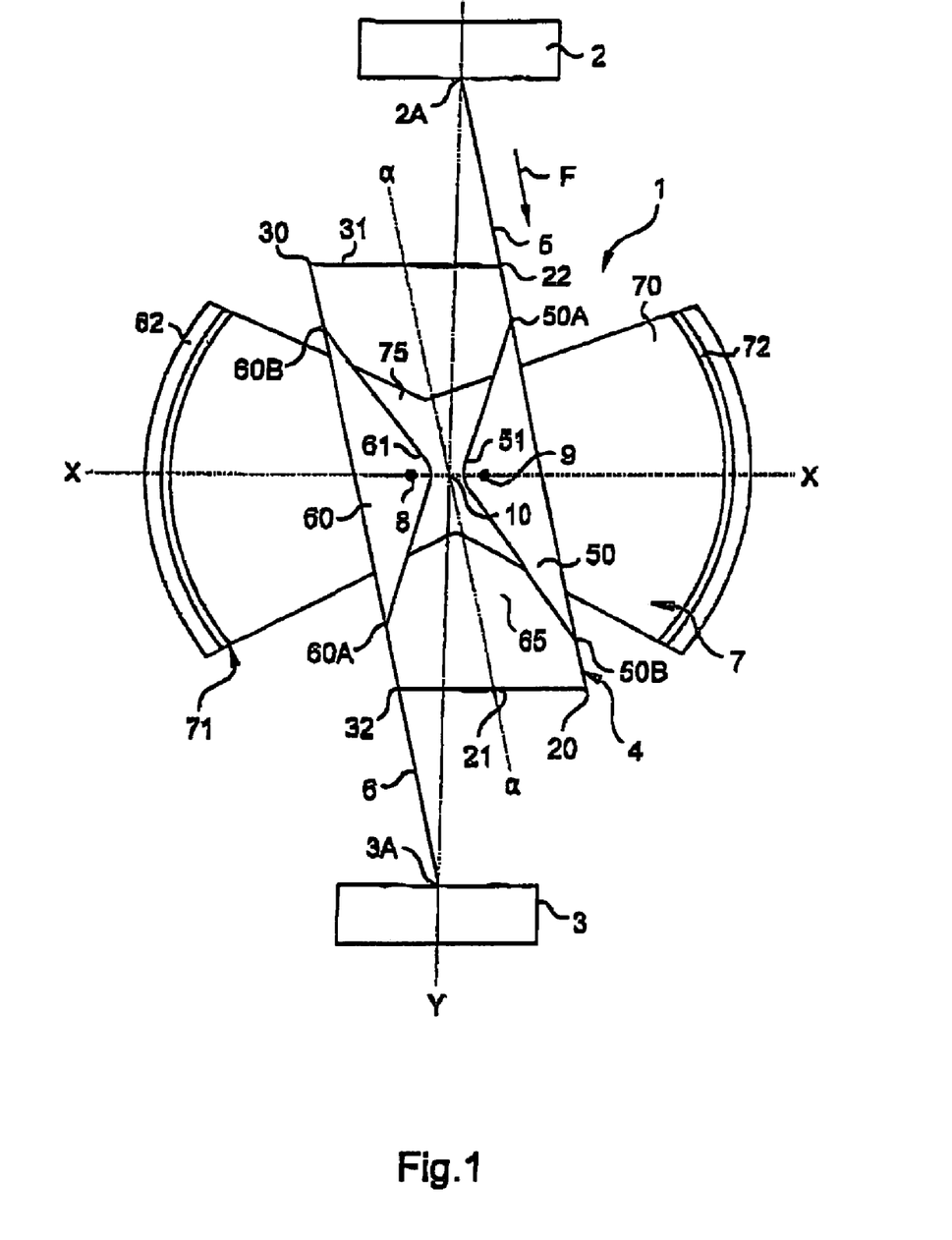
FIGS. 1 to 3 are diagrams showing the principle on which an anti-vibration device in a first embodiment of the invention operates.

The device 1 in accordance with the invention and shown diagrammatically in FIG. 1 is intended to filter the transmission of vibration between two parts 2 and 3, e.g. a vibrating part such as an engine and a support for said vibrating part.

To this end, according to the invention, the device 1 comprises:

at least a resilient plate 4 connected to said parts 2 and 3 at two respective fastening points 2A and 3A defining an axis YY, said plate being locally deformable under the action of vibration as represented by an arrow F, which vibration is transmitted from one of said parts to the other part; and at least a first resonator 7 connected via two laminated elastomer bearings 8 and 9 to said first plate in such a manner as to be set into oscillating pivoting motion in the event of local deformation of said first plate in such a manner the said first resonator generates an anti-vibratory inertia torsor which, by opposing said vibration F, filters transmission thereof, e.g. from the part 2 to the part 3.

To this end, said first plate is substantially symmetrical about a point 10 that is situated substantially between the laminated elastomer bearings 8 and 9 that together define an axis XX that is perpendicular to the axis YY.

The first plate 4 firstly comprises two rigid outer arms 5 and 6 disposed opposite each other and substantially symmetrically about the point 10. The outer arms 5 and 6 extend respectively between the point 2A and the outer vertex 20 of the first outer arm 5, and between the point 3A and the outer vertex 30 of the other outer arm 6.

In FIG. 1, it can be seen that the outer arms 5 and 6 respectively comprise the following elements:

for the first outer arm 5: a first segment represented by a line extending between the point 2A (or outer end) and the inner vertex 22, and a second segment represented by the line extending between the inner vertex 22 and the outer vertex 20; and for the other outer arm 6: a first segment represented by the line extending between the point 3A (or outer end) and the inner vertex 32, and a second segment represented by the line extending between the inner vertex 32 and the outer vertex 30.

The lines (2A-22) and (22-20) are not necessarily rectilinear, nor are they necessarily in alignment. The same applies to the lines (3A-32) and (32-30), it being understood that for reasons of convenience the notation (U-V) is used herein to designate a line extending between a point U and a point V.

The outer arms 5 and 6 are connected together by two resilient first extensions 21, 31 formed in the plane XX-YY of said first plate 4 in such a manner that:

the resilient first extension 21, represented by the line (20-32) connects the outer vertex 20 of the first outer arm 5 to the inner vertex 32 of the other outer arm 6; and the resilient first extension 31, represented by the line (30-22) connects the outer vertex 30 of the other outer arm 6 to the inner vertex 22 of the first outer arm 5.

In addition, each outer arm 5, 6 has a respective inner second extension 50, 60 in the plane XX-YY of said first plate 4, extending between the resilient first extensions 21, 31, each inner second extension 50, 60 having the appearance of a triangle with a respective rounded vertex 51, 61 such that the rounded vertices 51, 61 face each other without coming in contact, thereby leaving a gap 65 in the central zone of said plate 4. In FIG. 1, the inner second extensions 50 and 60 are thus represented respectively by the triangles (50A-51-50B) and (60A-61-60B).

Advantageously, each outer arm 5 and 6 is shaped at its outer end, i.e. at each respective fastening point 2A or 3A, with a respective first eye joint 52, 62, these eye joints each being designed to receive a pin for connecting with the corresponding part.

The first eye joints 52 and 62 are not shown in FIG. 1.

Similarly, each inner second extension 50, 60 is shaped respectively at the rounded vertex 51, 61 to form a second eye joint 53, 63, these eye joints being designed to receive respective connection pins (e.g. bolts) for connection with the resonator 7. The second eye joints 53 and 63 are not shown in FIG. 1.

The resonator 7 comprises at least one main core 70 having two bores 78 and 79 (not shown in FIG. 1) for receiving the two laminated elastomer bearings 8 and 9 in a reinforced central zone 75 so as to enable said resonator 7 to be connected to said first plate 4 by means of bolts. This connection is described in greater detail below for a particular variant embodiment of the invention.

The main core 70 contained in the pivot plane XX-YY of said resonator 7 has preferably a shape of reduced thickness in the direction of the axis YY and elongate in shape in the direction of the axis XX.

Furthermore, the resonator 7 is advantageously fitted with a rim 72 substantially in the form of a circular arc and disposed at each outer end 71 of the elongate shape, so as to increase the mass of the resonator as far away as possible from the center 10 of the device, thereby correspondingly increasing the inertia torsor.

In order to further increase the effectiveness of the device 1, it is also possible to place an additional mass 82 on the outside of each rim 72, the additional mass being of high density, i.e. being made of a material such as inermet, for example. The rim 72 and the optional additional mass 82 constitute the essential portions of the vibrating masses.

By construction, the second moment of area of the first plate 4 is large relative to its main bending axis αα. As a result, compared with French patent No. 2 787 161, there is a reduction in the level of the mechanical stresses acting on said first plate and resulting from the static and dynamic forces transmitted by one of said parts 2 or 3 to the other part. Furthermore, these smaller mechanical stresses are minimal in the vicinity of the connections via the laminated elastomer bearings 8 and 9 to said resonator 7. Consequently, the transmission of static and dynamic forces from one of said two parts 2 and 3 to the other takes place essentially via said outer arms 5 and 6 and the resilient first extensions 21 and 31. This off-loading of the forces on the connections to the first plate 4 makes it possible to reduce the dimensioning of said second eye joints 53, 63, thus making it possible to obtain a first reduction in the distance between the laminated elastomer bearings 8 and 9.

A second reduction in the distance between these two connections between the first plate 4 and the resonator 7 can be obtained by integrating the laminated elastomer bearings in the reinforced central zone 75 of the resonator. As a result, this reinforced central zone 75 itself constitutes the outer strength members of the laminated elastomer bearings. The amplification ratio $\lambda$ as defined above can thus be increased by 50% or even more compared with devices known elsewhere.

In addition, it can be seen that the resonator 7 is subjected essentially to dynamic stresses in shear and is not subjected to static or dynamic forces exerted by the two parts 2 and 3, as happens with the resonator as disclosed in French patent No. 2 787 161, thereby making it easier to obtain the second reduction in the distance between the two connections between the first plate 4 and the resonator 7, and also making it possible to make the core 70 and the rim 72 out of an aluminum alloy, for example, thus obtaining a substantial saving in weight, which is particularly important for an application to an aircraft, such as a helicopter, for example.

Figure 2:
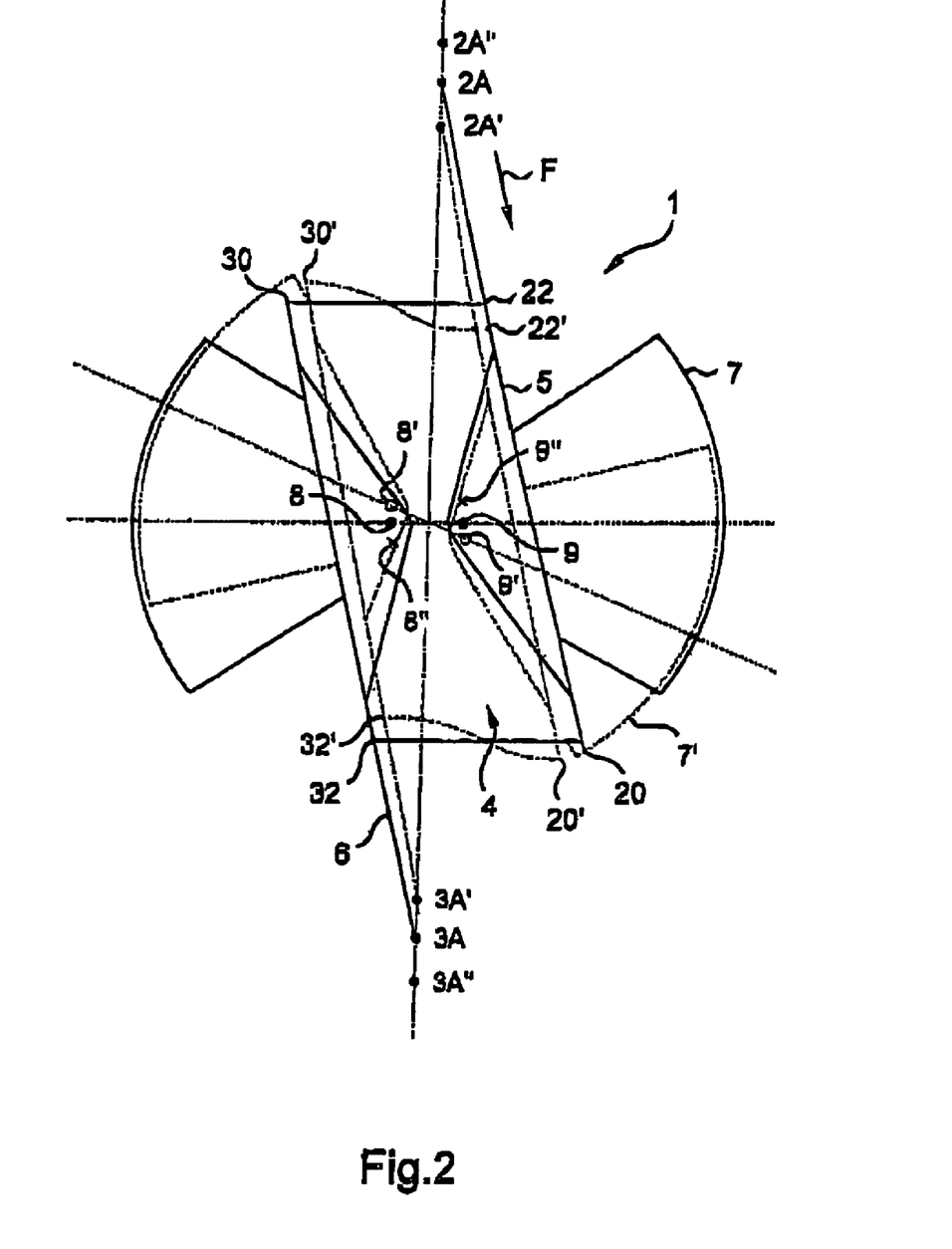

FIG. 2 is a diagram showing the operation of the device 1 in accordance with the invention.

Under the effect of stresses due to static forces, the first plate 4 and the first resonator 7 occupy a position shown in continuous lines. The fastening points of the outer arms 5 and 6 respectively to said parts 2 and 3 are referenced 2A and 3A.

The deformation of the first plate 4 is drawn in dashed lines and is greatly exaggerated for ease of understanding. Under such conditions, the fastening points 2A and 3A occupy respectively the positions 2A' and 3A' as shown in FIG. 2 when the stress is in compression, and then 2A" and 3A" when the stress is in traction. Naturally, these alternating stresses in traction and in compression are the result of the effect of the vibration transmitted by one of said two parts 2 and 3 to the other.

Under these conditions, the outer arms 5 and 6 are subjected merely to displacement with practically no deformation because they are very rigid. However, the resilient first extensions 21 and 31 deform locally so that overall the pins connecting said first plate 4 to said first resonator 7, as carried by the two laminated elastomer bearings, are displaced from initial positions 8 and 9 respectively to positions 8' and 9' for dynamic stress in compression and then to positions 8" and 9" for dynamic stress in traction. These displacements of the laminated elastomer bearings lead to oscillating pivoting motion of the first resonator 7, thereby generating an antivibratory inertia torsor that is exerted on said first plate 4, and thus filtering, if not eliminating, the transmission of vibration from one of said two parts 2 and 3 to the other part.

Figures 3, 4:
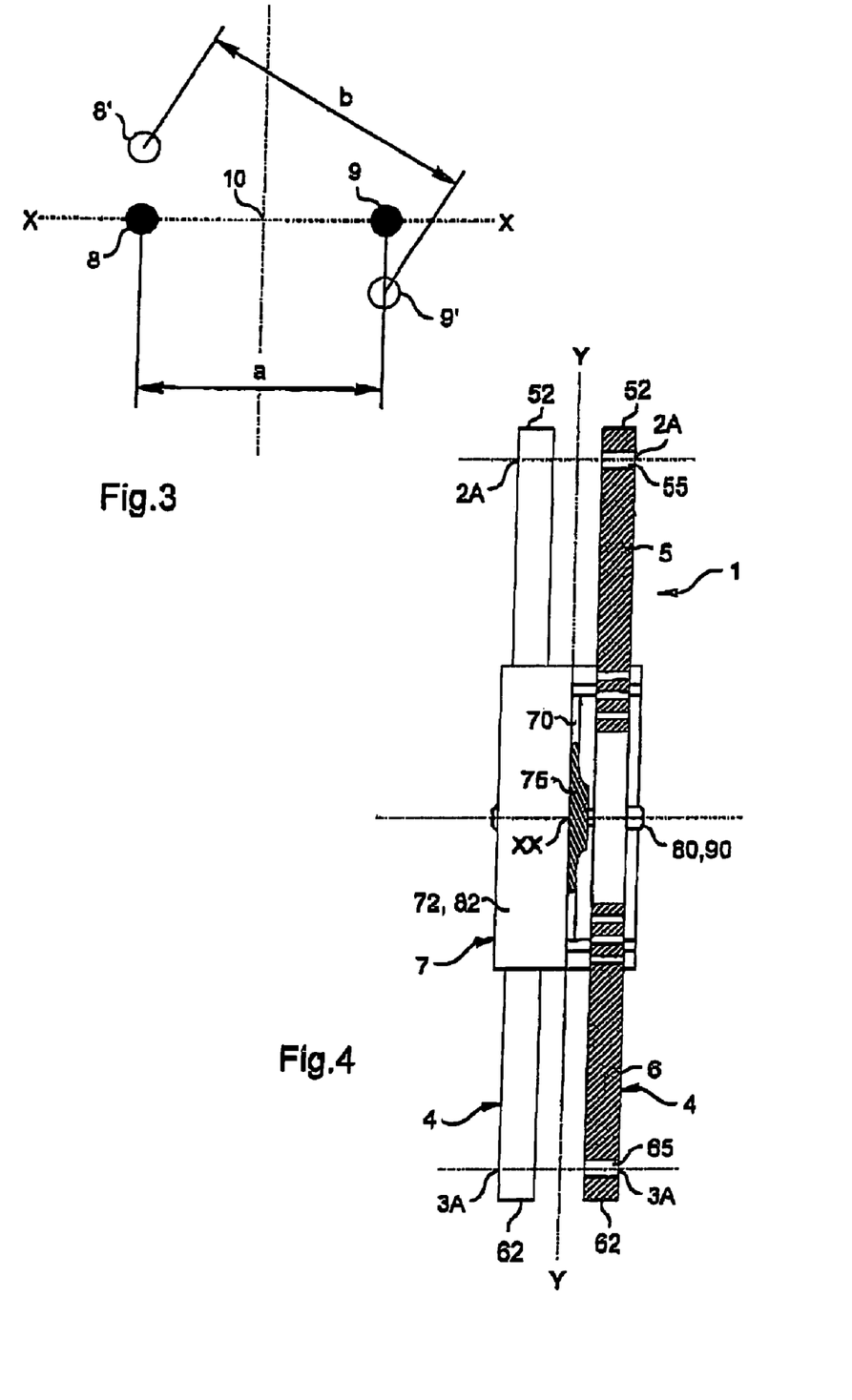
FIG. 4 is a side view of a second embodiment of an anti-vibration device in accordance with the invention, in section on line IV-IV of FIG. 5.

Nevertheless, it is important to observe, as can be seen in FIG. 3, that setting the first resonator 7 into movement by means of the first plate 4 is made possible by use of bearings 8 and 9 that are of laminated elastomer type.

The flexibility of the first extensions 21 and 31 is localized so that the respective outer vertices 20 and 30 and inner vertices 22 and 32 of the outer arms 5 and 6 constitute respective substantially fixed end connections for said first extensions 21 and 31, as described below. This construction limits deformation of the spacing a in said first plate 4 between the axes of the bearings 8 and 9, in comparison with other types of construction. Nevertheless, it happens that the spacing b between the positions 8' and 9', for example, is different from the spacing a, because of the deformation of said first plate 4.

However the core 70 of the resonator is practically undeformable in the plane XX-YY, and consequently the spacing between the bearings 8 and 9 remains unchanged if the bearings are made of rigid materials.

The system of the invention making use of laminated elastomer bearings is particularly well suited to this situation since it makes it possible specifically to deform the spacing between a value a and a value b because there is a certain amount of flexibility between the inner portion and the outer portion of such a bearing, as explained below with reference to a variant embodiment of the device of the invention.

Figure 5:
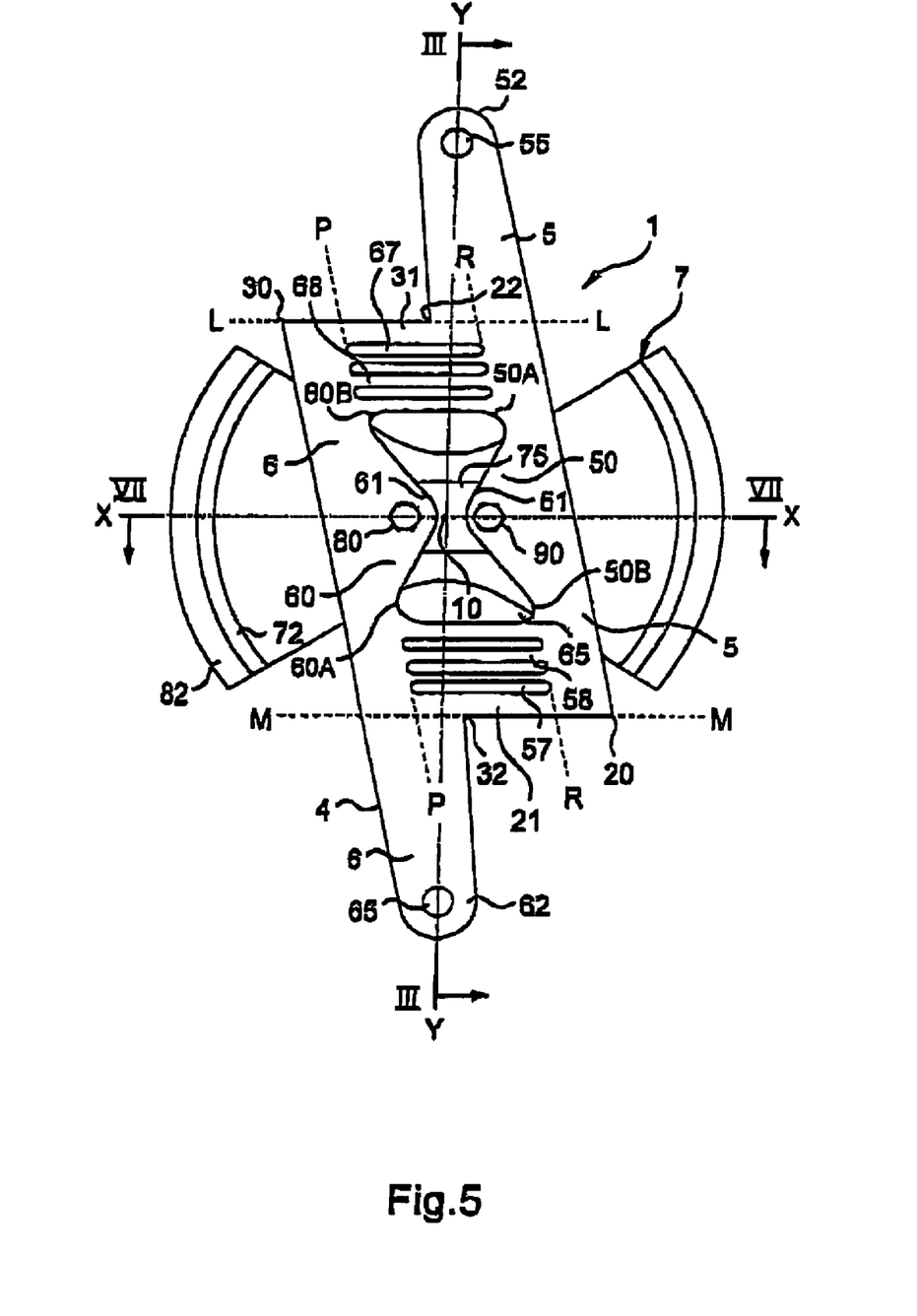
FIG. 5 is a face view of the FIG. 4 embodiment.
Figure 6:
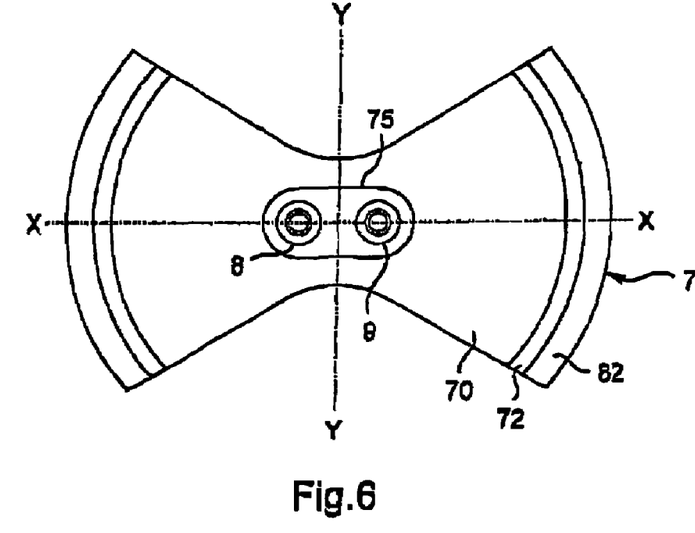
FIG. 6 is a face view of the resonator forming part of the FIG. 4 embodiment.

In the practical embodiment shown in FIGS. 4 to 6, there can be seen the same references for the elements of the vibration filter device that are shown diagrammatically in FIGS. 1 and 2.

As can be seen in FIG. 4, the anti-vibration device 1 nevertheless corresponds to a variant having first and second resilient plates 4. Each of these substantially-identical plates is disposed symmetrically about the plane XX-YY and is connected to said parts 2 and 3 via respective fastener points 2A and 3A. Each outer arm 5, 6 is shaped at its outer end to form a respective first eye joint 52, 62. The two bores 55, one bore 55 being made in each of the two eye joints 52, together constituting a clevis supporting a connecting bolt (not shown) for connection with said part 2. Similarly, the two bores 65 relating to the two eye joints 62 likewise constitute a clevis supporting a connecting bolt (not shown) for connecting with said part 3.

Figure 7:
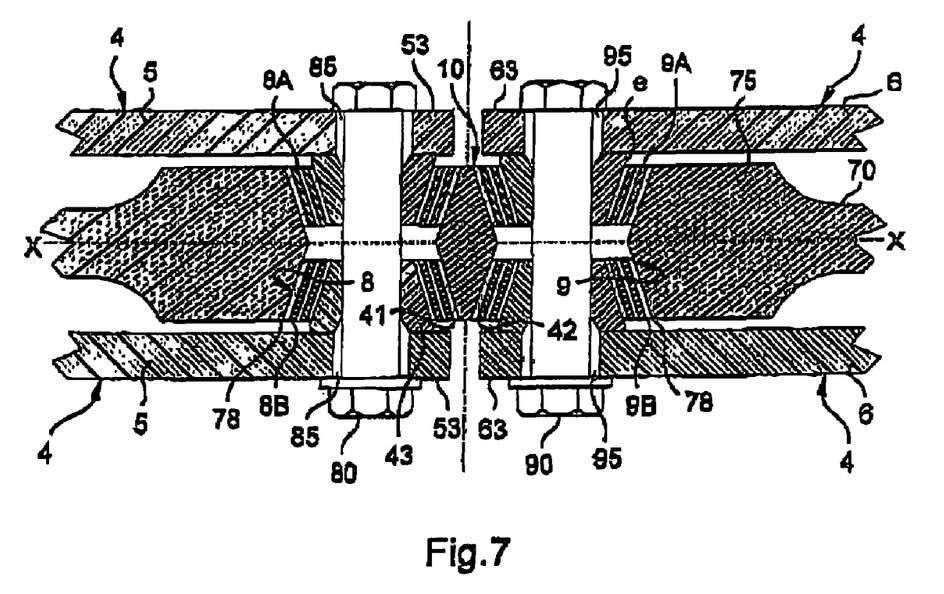
FIG. 7 shows how the laminated elastomer bearings are made, in section on line VII-VII of FIG. 5.

A first resonator 7 having at least one core 70, a rim 72, and optionally an additional mass 82, is disposed between each of the plates 4. The core of the resonator presents a thickening in its central zone 75 for receiving the two laminated elastomer bearings 8 and 9. In this way, the two plates 4 and the resonator 7 are connected together by two bolts 80 and 90, for example The bolt 80 is supported by two bores 85, one bore 85 in each of the second eye joints 53, thereby constituting a clevis. Similarly, the bolt 90 is supported by two bores 95, each bore 95 in a corresponding one of the second eye joints 63, thereby constituting a clevis. The elements 53, 63, 85, and 95 are not shown in FIG. 4. The bolts 80 and 90 hold the first resonator 7 by passing through respective laminated elastomer bearings B and 9. The details of the fastening between the two plates 4 and the resonator 7 are shown in FIG. 7 which is described in greater detail below.

FIG. 5 is a face view of the device 1 constituting a second embodiment as shown in FIG. 4.

Firstly, FIG. 5 shows the appearance of the outer arms 5 and 6 of a plate. It can be seen that:

the outer arm 5 comprises:
  a first segment extending between the eye joint 52 (with a bore 55 relating to the fastening point 2A) and the line LL (in dashed lines) passing substantially via the inner vertex 22 and the outer vertex 30; and
  a second segment extending firstly between the line LL and the line MM (drawn in dashed lines) passing substantially via the inner vertex 32 and the outer vertex 20, and secondly situated on the right-hand side of the line RR (in dashed lines), i.e. in a zone that does not have any openings; and the outer arm 6 comprises:
  a first segment extending between the eye joint 62 (with a bore 65 relating to the fastener point 3A) and the line MM; and
  a second segment extending firstly between the line MM and the line LL, and secondly situated to the left of the line PP (in dashed lines), i.e. in a zone that does not have any openings.

Secondly, relating to each of said two plates 4, FIG. 5 shows the two resilient first extensions 21 and 31 respectively interconnecting:

firstly the outer vertex 20 of the outer arm 5 to the inner vertex 32 of the outer arm 6; and
secondly the outer vertex 30 of the outer arm 6 to the inner vertex 22 of the outer arm 5.

Each of these two resilient connections leads to the zones 21 and 31 being made locally more flexible by providing respective mutually-parallel slots 57 and 67 extending in a direction that is substantially perpendicular to the axis YY.

As a result, each of the resilient extensions 21 and 31 is in the form of a plurality of parallel blades respectively referenced 58 and 68, each connecting the outer vertex 20, 30 of one outer arm to the inner vertex 32, 22 of the other outer arm.

It can be seen that these blades 58 and 68 do indeed have fixed end connections to their respective outer arms, thereby confirming the appearance of the device 1 when deformed under the effect of dynamic forces transmitted by one of the parts 2 or 3 to the other part, as shown diagrammatically in FIG. 2.

Furthermore, FIG. 5 shows the triangular appearance of the inner second extensions 50, 60 (one inner extension 50 and one inner extension 60 per plate). These inner extensions 50 and 60 are respectively shaped to form eye joints at their corresponding rounded vertices 51 and 61.

FIG. 6 shows the appearance of a resonator seen in face view, comprising:
  a zone that is of reduced thickness along the axis YY;
  a zone that is elongate along the axis XX; and
  a zone that is reinforced or thickened in the vicinity of 75, i.e. where the connections are made between said resonator 7 and said two plates 4.

FIG. 7, taken together with FIGS. 4 and 5, shows the details of the connection between the two plates 4 and the resonator 7.

As described above, the bolts 80 and 90 are supported in respective devises formed by the second eye joints 53 and 63 provided with respective bores 85 and 95 in the plates 4.

Furthermore, the laminated elastomer bearings 8 and 9 support the bolts 80 and 90 respectively, thereby fastening the resonator 7 to said two plates 4.

In practice, each laminated elastomer bearing 8 and 9 is made respectively as two laminated elastomer half-bearings 8A, 8B (bearing B) and 9A, 9B (bearing 9).

Advantageously, each laminated elastomer half-bearing 8A, 8B, 9A, 9B is:
  firstly, constituted by a stack of elastomer layers 41 extending between metal layers 42; and
  secondly, preferably of conical shape 80 that the layers 41 and 42 are frustoconical in shape.

Furthermore, the internal strength member 43 in each half-bearing is made of metal (a suitable metal is steel, for example) having a central bore enabling the bolts 80 and 90 to be put into place and presenting an extra thickness $\underline{e}$ adjacent to the plates 4. It is recalled that the outer strength members of said laminated elastomer half-bearings are constituted by the reinforced central zone 75 of the resonator 7.

This type of conical laminated elastomer bearing 8 and 9 thus serves to take up both radial and axial forces and also introduces prestress on assembly when the bolts are tightened, thereby improving the fatigue behavior of the elastomer, in particular in shear.

Consequently, the spacing a between the conical laminated elastomer bearings can be subjected to variations in size, which variations are indeed very small in an application to a helicopter main transmission gearbox, given that the variations between the fastener points 2A and 3A are of the order of only 3 mm to 5 mm.

It will thus be understood that the deformations of the resilient plates 4 lead to the resonator 7 being caused to pivot under the effect of dynamic stresses, and consequently to filter transmission of vibration from one of the parts 2 or 3 to the other part.

In addition, it should be observed that such conical laminated elastomer bearings can be integrated directly in the resonator 7 by molding the frustoconical elastomer layers 41 between the metal layers 42 and the bores 78 and 79 formed in the reinforced portion 75 of said resonator 7. This construction whereby the reinforced zone 75 of the resonator acts as the outer strength member of the conical laminated elastomer bearings enables the bolts 80 and 90 to be optimally close together, thereby correspondingly increasing the effectiveness of the anti-vibration device 1 by ensuring that the large pivot masses constituted by the rim 72 and any additional masses 82 are as far away as possible from the pivot axes of the resonator 7 as represented by the bolts 60 and 90.

Figures 8, 9:
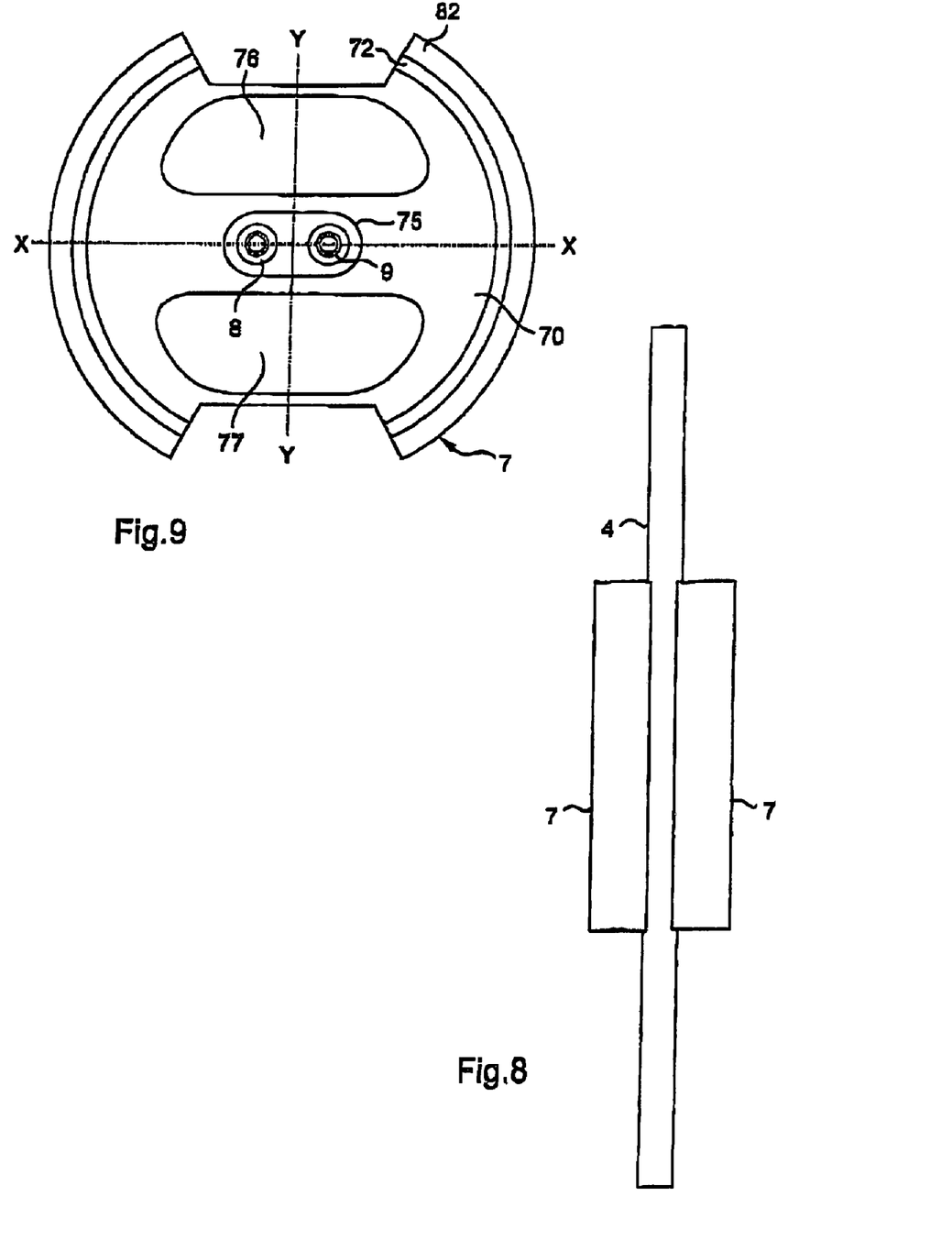
FIG. 8 is a side view of a third embodiment of an anti-vibration device in accordance with the invention.
FIG. 9 shows a second embodiment of a resonator in accordance with the invention.

A third variant is shown in side view in FIG. 8. This is a device in accordance with the invention comprising a single plate 4 and two resonators 7 disposed on either side of the single plate. In this case, the three elements are still fastened together using conical laminated elastomer bearings each made up of two portions.

Furthermore, it should be observed, in FIG. 9, that the core 70 of the resonator may include in a variant two openings 76 and 77 that are elongate in the direction of the axis XX, for example, this serving to save weight.

Figure 10:
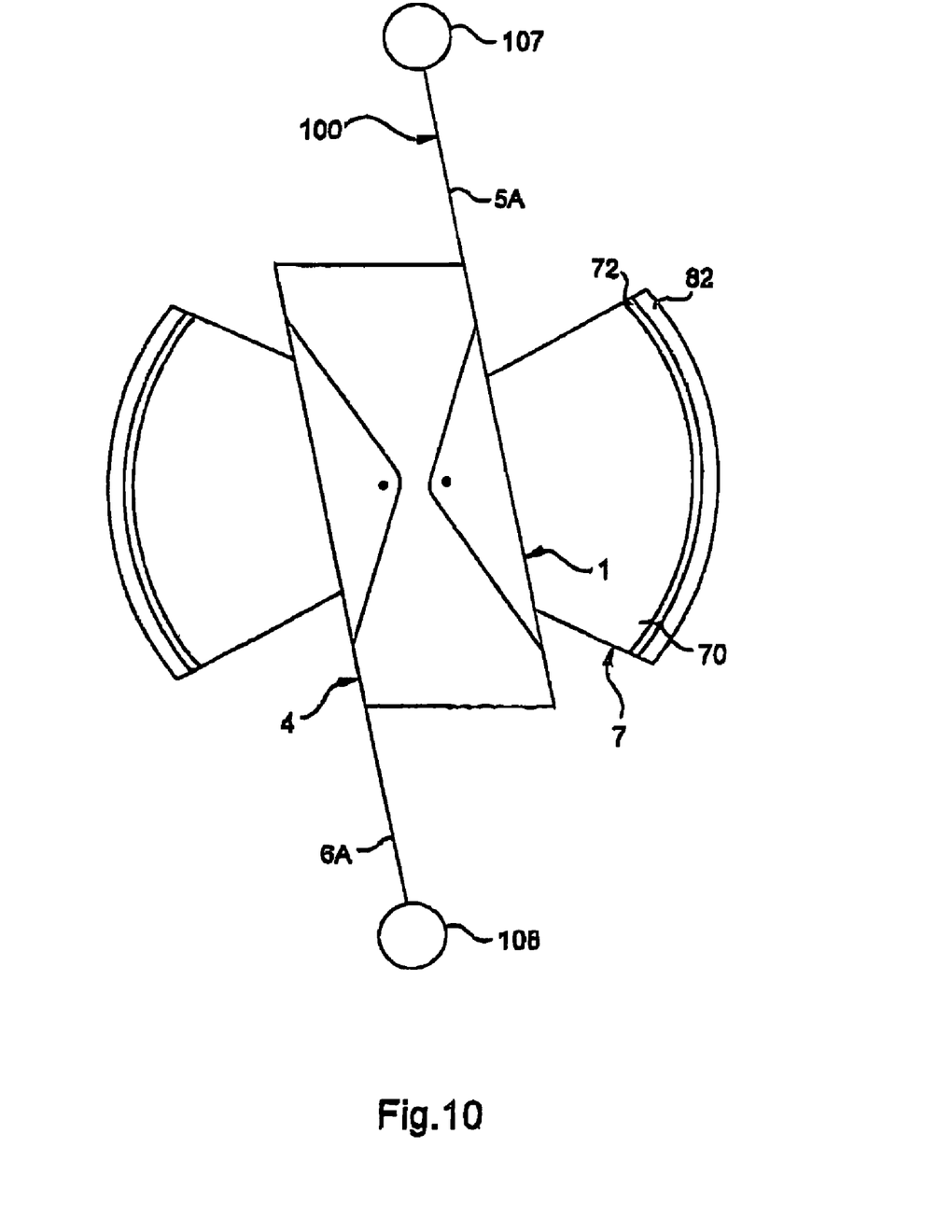
FIG. 10 shows the device integrated in a bar.

The device 1 of the invention as described above can be applied to any type of system in which it is appropriate to reduce the transmission of vibration between two parts. To this end, it may:

either be arranged directly between the two parts 2 and 3, as shown in FIG. 1; or else be integrated in a connection or fastener bar 100, as shown in FIG. 10, where the parts 2 and 3 are replaced by two segments 5A and 6A of said bar 100, which may be hinged to two elements, at least one of which vibrates, via ball-and-socket connections including respective balls 107 and 108 provided at the free ends of said segments 5A and 6A.

Figure 11:
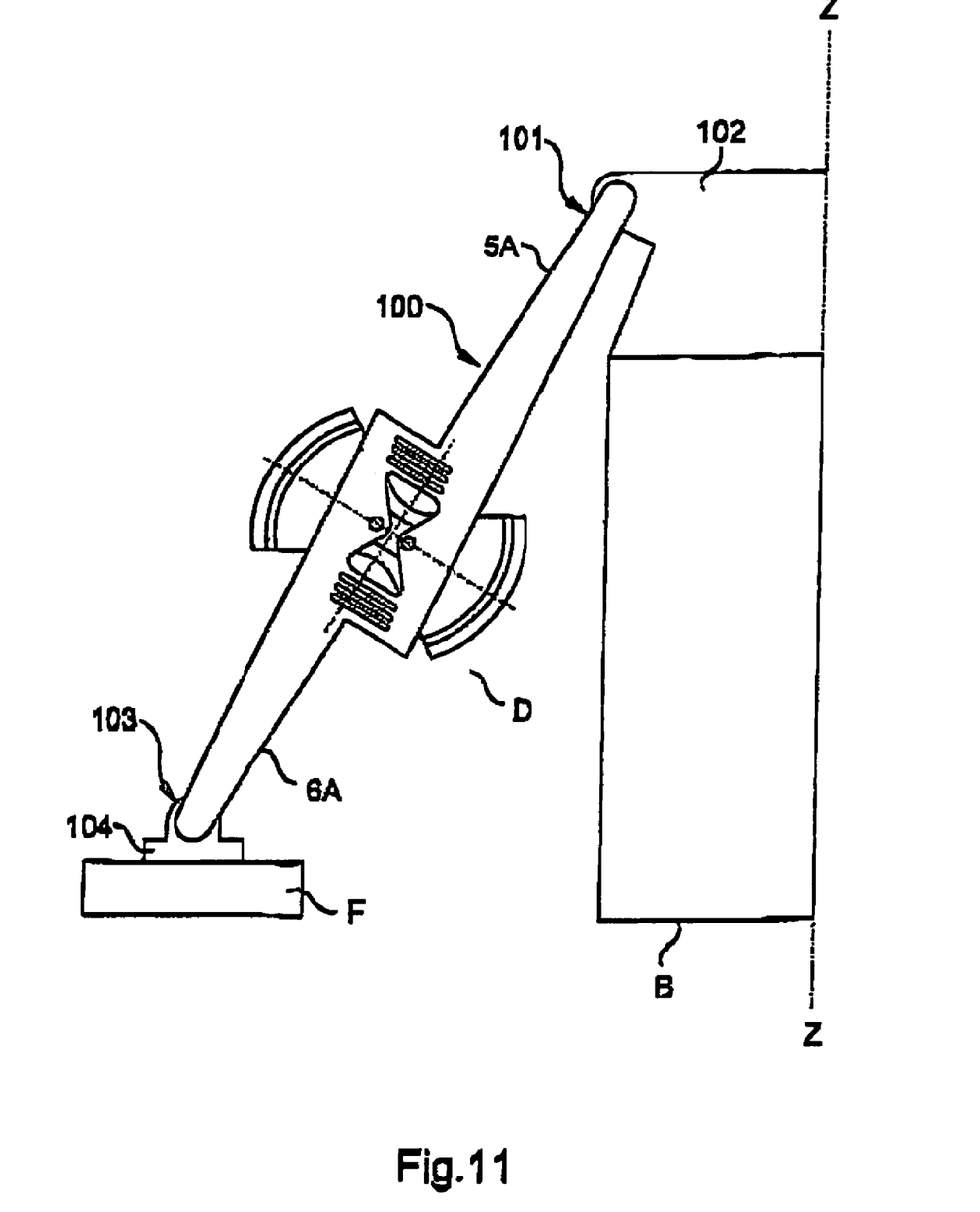
FIG. 11 is a diagram showing the device of FIG. 5 integrated in a device for suspending a rotary wing aircraft main transmission gearbox.

Nevertheless, in a preferred embodiment, said device 1 is used to improve a suspension device D for a rotary wing aircraft transmission gearbox B, as shown diagrammatically and in part in FIG. 11.

In conventional manner, such a transmission gearbox B, e.g. the main transmission gearbox of a helicopter, is mounted between propulsion means and a rotor (not shown) for providing said aircraft with lift, in a manner that is substantially longitudinal relative to the axis Z-Z of said rotor, and is suspended relative to the fuselage F of said aircraft.

To make this suspension, the suspension device D comprises in conventional manner support bars that are distributed radially around said transmission gearbox B, with the top ends 101 of the bars being hinged to the top portion 102 of the transmission gearbox B, and with the bottom ends 103 of the bars being hinged to said fuselage F via respective bearings 104 or suspension blades that are not shown.

In order to simplify the drawing, only one support bar is shown in FIG. 11.

In the invention, at least some of the support bars of said suspension device D are implemented in the form of pairs of segments 5A and 6A and include respective anti-vibration devices 1 of the invention, e.g. devices of the kind shown in any one of FIGS. 1 to 10.

In FIG. 11, the embodiment of the anti-vibration device 1 is the embodiment shown explicitly in FIG. 5. Naturally, other embodiments in accordance with the invention could equally be used for this purpose.

In addition, in FIG. 11, the invention is applied to a simplified suspension device D.

Nevertheless, it could naturally likewise be applied to a device D that further includes a suspension system (not shown) of conventional type and as described in particular in French patent No. 2 747 098, connecting the bottom portion of the transmission gearbox to the aircraft fuselage and comprising:

suspension blades which are distributed radially around said transmission gearbox in a plane that is substantially orthogonal to the axis of the rotor, with the radially inner ends of the bars being fastened to the bottom portion of said transmission gearbox and with the radially outer ends of the bars being hinged to the fuselage; and a substantially plane diaphragm fastened under the transmission gearbox and projecting radially beyond said transmission gearbox having its peripheral portion fastened to the fuselage of the aircraft in a manner that is substantially orthogonal to the axis of the rotor, and being deformable in bending under the effect of forces acting orthogonally to its plane, while being rigid under the effect of forces acting in its plane.

In another embodiment of the invention (not shown), the anti-vibration device(s) 1 that is used is not integrated in the support bar, as in FIG. 11, but is arranged between the support bar and the element to which it is to be connected, i.e.:

either between the top end 101 of the support bar 100 and the top portion 102 of the transmission gearbox B; or else between the bottom end 103 of the support bar 100 and the fuselage F.

Thus, by means of the invention:

access is made available to the transmission gearbox B, thereby in particular making mounting and removal easier; and the cost of the suspension device D and its weight are both reduced, in particular by making the core and the rim of the resonator out of aluminum alloy, while simultaneously increasing the effectiveness of the device compared with prior art suspension devices.

Naturally, the present invention can be subjected to numerous variations as to its implementation. Although several embodiments are described above, it will readily be understood that it is not conceivable to identify exhaustively all possible embodiments. Naturally it is possible to envisage replacing any of the means described by equivalent means without going beyond the ambit of the present invention.

What is claimed is:

1. A device for filtering vibration between two parts (2 and 3), the device being characterized in that it comprises:

at least a first resilient plate (4) connected to said parts (2 and 3) at two respective fastening points (2A and 3A) defining an axis YY, said first plate (4) being locally deformable under the action of vibration transmitted by one of said two parts to the other part; and at least a first resonator (7) fitted with two laminated elastomer bearings (8, 9) which firstly define an axis XX that is substantially perpendicular to the axis YY, these axes XX and YY intersecting at a point (10), and secondly receive respective fastener means (80, 90) for fastening to said first resilient plate (4) in such a manner as to put said resonator (7) into oscillating pivoting motion during said local deformation of said first resilient plate (4) such that said resonator (7) generates an anti-vibratory inertia torsor that opposes said vibration and filters transmission thereof from one part to the other.

2. A device according to claim 1, characterized in that it further comprises a second resilient plate (4) substantially identical to the first resilient plate (4), the first and second resilient plates (4) facing each other on either side of said first resonator (7), and being connected to said resonator (7) by said fastener means (80, 90) supported respectively by said laminated elastomer bearings (8, 9).

3. A device according to claim 1, characterized in that it further comprises a second resonator (7) substantially identical to the first resonator (7), the first and second resonators (7) facing each other on either side of elastomer bearings (8, 9) of each of said first and second resonators (7).

4. A device according to claim 1, wherein said plate (4) has a first outer arm (5) extending between one of the fastening points (2A) and a first outer vertex (20), and has a second outer arm (6) extending between the other fastening point (3A) and a second outer vertex (30).

5. A device according to claim 4, wherein each of said outer arms (5, 6) is shaped at each of said fastening points (2A, 3A) to form a respective first eye joint (52, 62), each eye joint (52, 62) receiving a pin for connection with the corresponding part (2, 3).

6. A device according to claim 4, wherein said two outer arms (5 and 6) are connected together by resilient first extensions (21 and 31) in the plane XX-YY, the resilient first extension (21) connecting the outer vertex (20) of the first outer arm (5) to an inner vertex (32) of the second outer arm (6), and the second resilient extension (31) connecting the outer vertex (30) of the second outer arm (6) to an inner vertex (22) of the first outer arm (5).

7. A device according to claim 6, wherein said two resilient first extensions (21 and 31) produce local flexible zones (21 and 31) formed respectively by mutually-parallel slots (57 and 67) defining respective parallel blades (58 and 68) connecting each outer vertex (20, 30) of each outer arm respectively to the inner vertex (32, 22) of the other arm.

8. A device according to claim 7, wherein said blades (58, 68) extend in a direction that is substantially perpendicular to the axis YY.

9. A device according to claim 7, wherein said blades (58, 68) are identical in length.

10. A device according to claim 8, wherein the blades (58, 68) have fixed-end connections to their respective outer arms.

11. A device according to claim 6, wherein each outer arm (5, 6) has a respective inner second extension (50, 60) in the plane XX-YY, extending between the two resilient first extensions (21, 31), each inner second extension having the appearance of a triangle with a respective rounded vertex (51, 61), these rounded vertices facing each other without coming into contact, thereby defining a gap (65) in the central zone (75) of said plate (4).

12. A device according to claim 11, wherein each inner second extension (50, 60) is shaped at its rounded vertex (51, 61) in the form of a second eye joint (53, 63), each of said eye joints receiving a respective connection means (80, 90) for connecting said plate (4) to said resonator (7).

13. A device according to claim 1, wherein said plate (4) is symmetrical about the point (10) of intersection of the axes XX and YY.

14. A device according to claim 1, wherein said resonator (7) comprises firstly a core (70) of shape that is elongate in the direction of said axis XX and of shape that is of reduced thickness in the direction of said axis YY, and secondly a rim (72) at each outer end of the core.

15. A device according to claim 14, wherein the core (70) of said resonator (7) has two openings (76 and 77), that are symmetrical about the axis XX and that are substantially oblong in the direction of said axis XX.

16. A device according to claim 14, wherein said resonator (7) presents reinforcement in a central zone (75) of the core (70).

17. A device according to claim 14, wherein the core (70) and the rim (72) of said resonator (7) are made of aluminum alloy.

18. A device according to claim 14, wherein an additional mass (82) is disposed on the rim (72).

19. A device according to claim 18, wherein said additional mass (82) is made of inermet.

20. A device according to claim 14, wherein said resonator (7) is symmetrical about the point (10) of intersection between the axes XX and YY.

21. A device according to claim 1, wherein each of said laminated elastomer bearings (8 and 9) is constituted by two half-bearings (8A, 8B; 9A, 9B), with the outer strength members thereof being constituted by the reinforced central zone (75) of the resonator (7) and with the inner strength members (43) thereof being made of a suitable metal.

22. A device according to claim 21, wherein the laminated elastomer half-bearings (8A, 8B; 9A, 9B) are conical.

23. A device according to claim 21, wherein the laminated elastomer half-bearings (8A, 8B; 9A, 9B) are mounted with prestress in the reinforced zone (75) of the core (70) of the resonator (7).

24. A device according to claim 1, wherein said fastener means (80, 90) are constituted by bolts.

25. A device according to claim 1, wherein said two parts correspond to two segments (5A, 6A) of a bar (100).

26. A device for suspending a transmission gearbox (B) of a rotary wing aircraft, said transmission gearbox (B) being mounted between propulsion means and a rotor for providing said aircraft with lift in substantially longitudinal manner along the axis (Z-Z) of said rotor, and being suspended relative to the fuselage (F) of said aircraft, said suspension device (D) comprising support bars (100) distributed radially around said transmission gearbox (B) whose top ends (101) are connected to the top portion (102) of the transmission gearbox (B) and whose bottom ends (103) are connected to said fuselage (F), wherein at least some of said support bars (100) are made up of pairs of segments (5A, 6A), and wherein said suspension device (D) includes, for each of the support bars (100) formed in this way, a device (1) as specified in claim 1, that is arranged between said segments (5A, 6A) of said support bar (100).

27. A device for suspending a transmission gearbox (B) of a rotary wing aircraft, said transmission gearbox (B) being mounted between propulsion means and a rotor for providing said aircraft with lift in substantially longitudinal manner along the axis (Z-Z) of said rotor, and being suspended relative to the fuselage (F) of said aircraft, said suspension device (D) comprising support bars (100) distributed radially around said transmission gearbox (B) whose top ends (101) are connected to the top portion (102) of the transmission gearbox (B) and whose bottom ends (103) are connected to said fuselage (F), the suspension device further including, for at least some of said support bars, a device (1) as specified in claim 1, that is arranged at one end of the corresponding bar and that serves to reduce the transmission of vibration between said bar and the element to which said end of the bar is connected.

* * * * *